United States Patent [19]
Glennon

[11] Patent Number: 5,008,801
[45] Date of Patent: Apr. 16, 1991

[54] VSCF POWER CONVERSION SYSTEM USING AN OUTPUT AUTOTRANSFORMER

[75] Inventor: Timothy F. Glennon, Rockford, Ill.

[73] Assignee: Sundstrand Corporation, Rockford, Ill.

[21] Appl. No.: 448,311

[22] Filed: Dec. 11, 1989

[51] Int. Cl.$^5$ ............................................ H02M 7/521
[52] U.S. Cl. ........................................ 363/132; 363/98; 323/361; 336/5; 336/148
[58] Field of Search .................. 363/64, 131, 132, 135, 363/136, 137, 41, 43, 49, 71; 323/359, 361; 336/5, 145, 147, 148, 180, 183; 322/10

[56] References Cited

U.S. PATENT DOCUMENTS

| | | | |
|---|---|---|---|
| 3,657,633 | 4/1972 | Urish | 363/43 X |
| 3,838,331 | 9/1974 | Jensen | 363/72 X |
| 3,943,429 | 3/1976 | Heintze | 363/71 |
| 4,334,265 | 6/1982 | Thorborg | 363/72 |
| 4,841,216 | 6/1989 | Okada et al. | 322/10 |
| 4,862,341 | 8/1989 | Cook | 322/10 X |

Primary Examiner—Steven L. Stephan
Assistant Examiner—Emanuel T. Voeltz
Attorney, Agent, or Firm—Marshall, O'Toole, Gerstein, Murray & Bicknell

[57] ABSTRACT

Prior VSCF inverters have utilized relatively expensive bipolar transistors and associated base drive circuits together with an input autotransformer which unduly add to the cost and weight of the system. In order ot overcome these problems, a VSCF power converter includes an inverter which utilizes less expensive power switches such as insulated gate bipolar transistors, MOS controlled thyristors or power FET's, together with an output autotransformer coupled between the inverter output and a filter input which eliminates the need for the input autotransformer. The present system is less expensive and lighter than prior VSCF power converters.

11 Claims, 3 Drawing Sheets

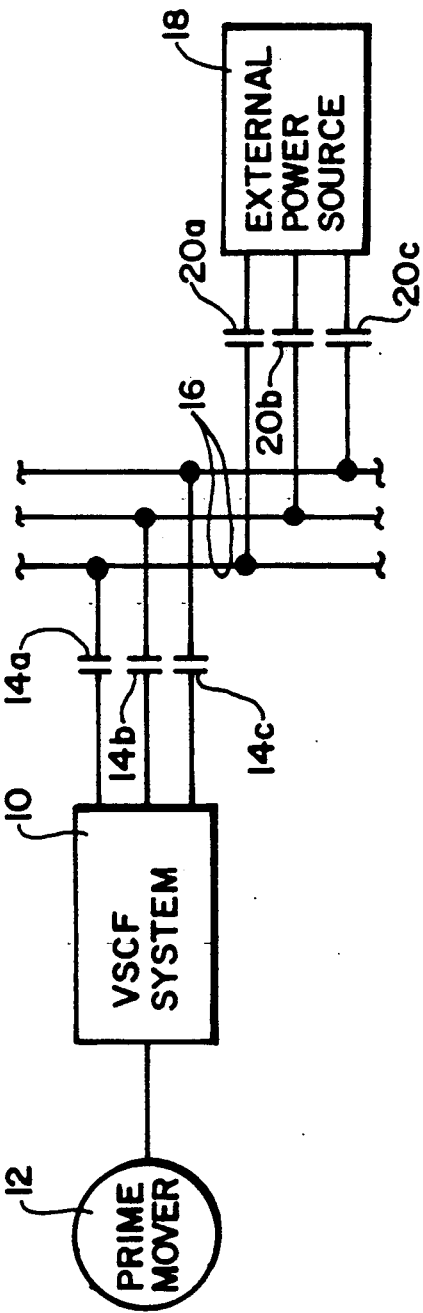
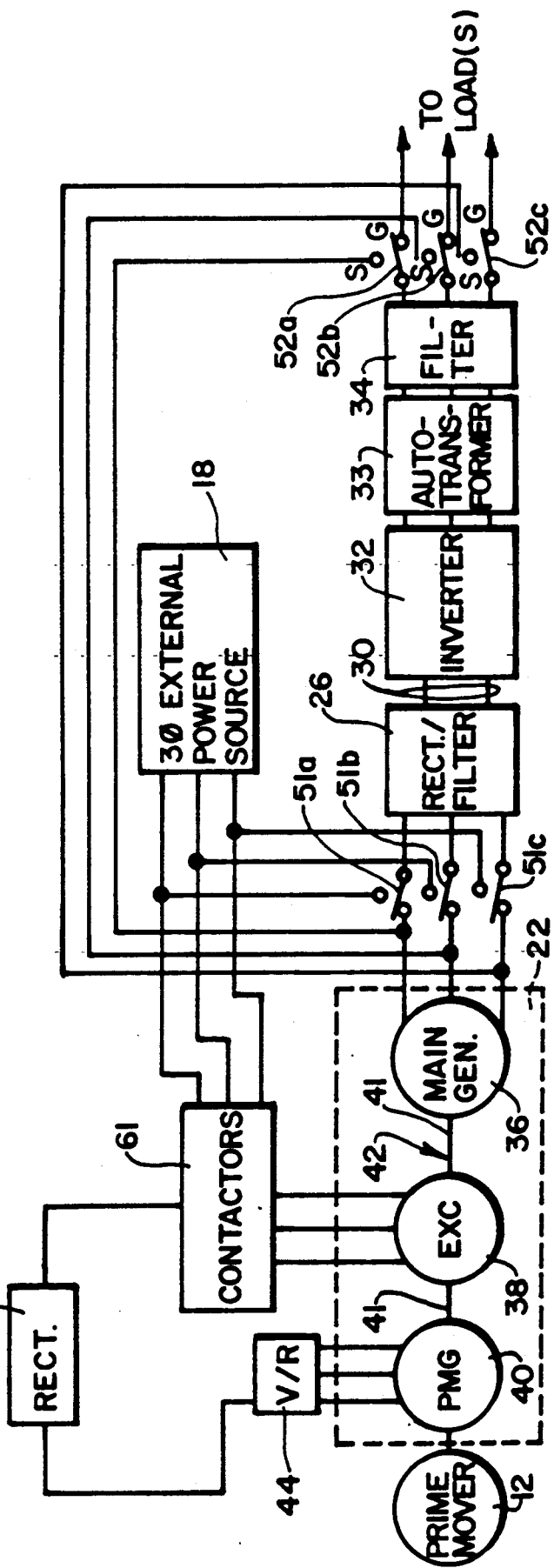
Fig. 1
Fig. 2

VSCF POWER CONVERSION SYSTEM USING AN OUTPUT AUTOTRANSFORMER

TECHNICAL FIELD

The present invention relates generally to power conversion systems, and more particularly to a variable speed, constant frequency (VSCF) system which is operable in generating and starting modes.

BACKGROUND ART

VSCF systems have been utilized to convert variable frequency electrical power developed by a generator driven by a variable speed prime mover into constant frequency power for AC loads. Such systems include a rectifier for rectifying the variable frequency output of the generator and an inverter for converting the rectified output into the constant frequency power. In prior VSCF systems, the inverter includes a number of bipolar switching transistors which are controlled by base drive circuitry. Also, an input autotransformer is connected between the generator output and the rectifier input to permit high voltage AC generation and distribution to the inverter which in turn reduces the weight of feeders coupled to the inverter.

It has been found that the cost of bipolar transistors and the required base drive circuits is relatively high. It has also been found that the weight of the input autotransformer together with the weight of a filter coupled to the inverter output cause the overall system weight to be undesirably increased.

The costs associated with the inverter can be reduced by utilizing other types of switching devices, such as insulted gate bipolar transistors (IGBT's), power FET's or MOS controlled thyristors (MCT's). Such types of switches are more cost effective than the bipolar transistor; however, these devices do not have the high current handling capabilities of bipolar transistors. Therefore, if such devices are to be used, they must be operated in parallel. As is generally known, operating semiconductor switching devices in parallel presents significant difficulties. Specifically, the characteristics of these devices must be carefully matched to insure that the currents handled by the devices are shared as equally as possible so that the potential of damage or destruction of the switches is minimized.

Inverters have been designed which include parallel power switches that are connected to end terminals of an interphase transformer having a mid-tap at which an output is produced. The interphase transformer is designed so that the output voltage at the mid-tap is at a level intermediate the voltages applied by the switches. In this type of inverter, each switch handles only a portion of the total output current magnitude. Patents disclosing such inverters include Urish, U.S. Pat. No. 3,657,633, Heintze, U.S. Pat. No. 3,943,429, Honbu, et al., U.S. Pat. No. 4,549,258 and Mizoguchi, U.S. Pat. No. 4,802,079.

Shilling, et al., U.S. Pat. No. 4,743,777 discloses a VSCF starter generator system using a brushless, synchronous generator. When operating in a starting mode at the beginning of a starting sequence, AC power developed by the external AC power source is directly applied to the three-phase AC exciter field windings. The AC power developed by the external AC source is further provided to a variable voltage, variable frequency power converter which in turn provides a controlled voltage and frequency to armature windings of a main generator. The AC power provided to the AC exciter field windings is transferred by transformer action to exciter armature windings disposed on a rotor of the generator. This AC power is rectified by a rotating rectifier and provided to a main field winding of the generator. The interaction of the magnetic fields developed by the main generator field winding and armature windings in turn causes the rotor of the generator to rotate and thereby develop the desired motive power. When the generator is operated in a generating mode, switches are operated to disconnect the AC exciter field windings and the main generator armature windings from the external AC source and to connect the power converter to the main generator armature windings. The power converter is thereafter operated to convert the variable frequency output of the generator into the designed fixed frequency power.

Messenger, U.S. Pat. No. 3,908,161 discloses a brushless generator including three exciter field windings which are connected in a wye configuration and provided three-phase AC power during operation in a starting mode. The three-phase AC power induces AC power in an exciter armature winding which is rectified and applied to a main generator field winding. Main armature windings receive controlled AC power to in turn cause rotation of the generator rotor. Thereafter, the three exciter field windings are connected in series and provided DC excitation when operating in a generating mode.

SUMMARY OF THE INVENTION

In accordance with present invention, a VSCF power conversion system operable in generating and starting modes is significantly lighter and less expensive than previous VSCF systems.

More particularly, a power converter for converting DC power supplied on a DC rail into AC power includes an inverter having first and second switches each coupled to the DC rail and an output autotransformer including first and second winding portions coupled to the first and second switches, respectively, wherein the first and second winding portions are connected together at a common junction. The autotransformer further includes a third winding portion coupled between the common junction and a particular potential. Means are provided for operating the inverter switches to convert the DC power on the DC rail into AC power at the common junction.

In a preferred embodiment of the invention, the switches are of the insulated gate type, for example insulated gate bipolar transistors (IGBT's) or comprise MOS controlled thyristors (MCT's). Alternatively, power FET's could be used if lower inverter voltages are to be produced. The first and second winding portions of the output autotransformer effectively operate as an interphase transformer to balance the currents flowing in the switches during operation so that problems associated with current sharing are minimized.

The inductance of the output autotransformer also permits the size of a filter coupled between the autotransformer and one or more AC loads to be reduced. In addition, the output autotransformer obviates the need for an input autotransformer and hence weight is desirably reduced as compared with prior systems.

If desired, additional switches can be connected in parallel with the two switches to increase the current handling capability of the inverter. In such a case, the autotransformer need only be modified by the addition of a winding portion coupled between each additional switch and the common junction. Thus, an inverter of virtually any current handling capability can be quickly and simply designed.

BRIEF DESCRIPTION OF THE DRAWINGS

FIG. 1 is a simplified block diagram of a power distribution system including the VSCF power conversion system of the present invention.

FIG. 2 is a simplified combined electrical and mechanical block diagram of the system of FIG. 1 illustrating the power conversion system of the present invention in greater detail.

DESCRIPTION OF THE PREFERRED EMBODIMENT

Figure 3:
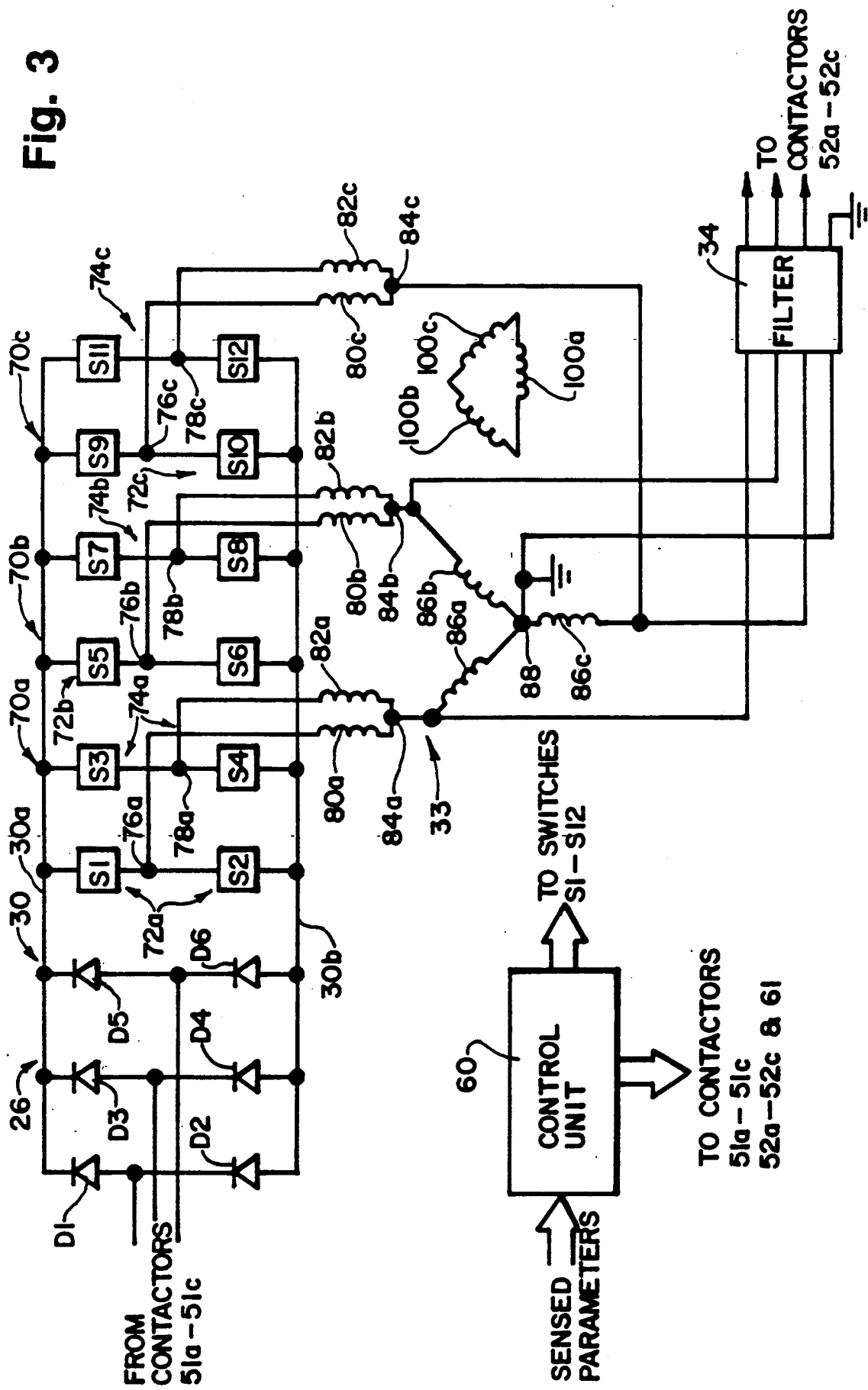
FIG. 3 comprises a combined simplified schematic and block diagram of the rectifier, inverter, autotransformer and filter illustrated in FIG. 2.
Figure 4:
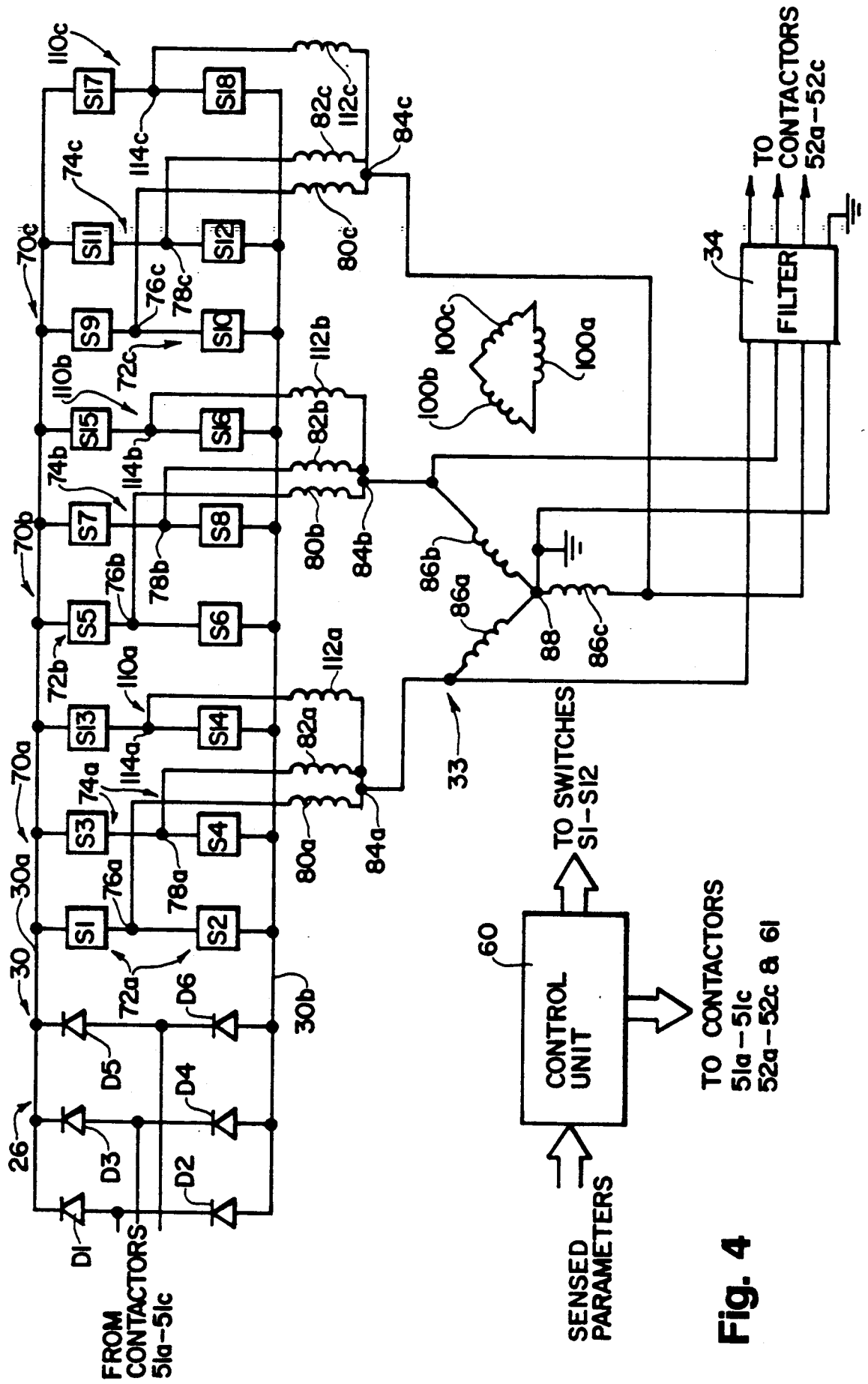

Referring now to FIG. 1, a variable speed, constant frequency (VSCF) system 10 operates in a generating mode to convert variable speed motive power produced by a prime mover 12, such as an aircraft jet engine, into constant frequency AC electrical power which is delivered through controllable contactors 14a, 14b and 14c to a load bus 16. The VSCF system 10 is also operable in a starting mode using electrical power provided by an external power source 18, such as a ground power cart, which is in turn coupled to the load bus 16 through controllable contactors 20a-20c. Alternatively, the electrical power for use by the VSCF system 10 in the starting mode may be provided by another source of power, such as another VSCF system which is driven by a different prime mover. In any event, the VSCF system 10 converts electrical power into motive power when operating in the starting mode to bring the prime mover 12 up to self-sustaining speed. Once this self-sustaining speed (also referred to as "light-off") is reached, the prime mover 12 may be accelerated to operating speed, following which operation in the generating mode may commence.

Referring now to FIG. 2, the VSCF system 10 includes a brushless, synchronous generator 22 driven by the prime mover 12. During operation in the generating mode, the generator 22 develops polyphase, variable frequency AC power which is converted into DC power by a rectifier/filter 26. The resulting DC power is provided over a DC link 30 to a polyphase inverter 32 which converts the DC power into three-phase, constant frequency AC power. This AC power is provided by an autotransformer 33, an optional filter 34 and the set of controllable contactors 14a–14c to the load bus 16.

The generator 22 includes a main generator portion 36, an exciter portion 38 and a permanent magnet generator (PMG) 40, all of which include rotor structures mounted on a common shaft 41 of a rotor 42. In the generating mode of operation, rotation of the common shaft 41 in turn causes polyphase power to be developed in armature windings of the PMG 40 which is in turn delivered to a voltage regulator 44. The voltage regulator 44 and a rectifier 46 deliver a controlled magnitude of DC current to field windings of the exciter 38. This current induces an AC voltage in armature windings of the exciter 38 which is rectified by a rotating rectifier. The resulting DC power is supplied to a field winding (not shown) of the main generator 36. Rotation of the common shaft 41 while the field current is flowing in the field winding of the main generator portion 36 causes polyphase voltages to be developed in armature windings of the main generator portion 36. As seen specifically in FIG. 2, these voltages are supplied through contactor sets represented by single-pole, two-throw switches 51a–51c to the rectifier 26. Also during operation in the generating mode, a set of contactors represented by single-pole, switches 52a–52c connects the output of the the filter 34 to the contactors 14a–14c so that the AC power is provided to the load bus 16. It should be noted that the contactors 14a–14c and 20a–20c are not shown in FIG. 2 for clarity.

During operation in the starting mode, the contactor sets represented by the switches 51a–51c and 52a–52c are moved to the positions opposite those shown in FIG. 2 so that the external AC power source 18 is coupled to the input of the rectifier 26 and the output of the filter 34 is coupled to the armature windings of the main generator 36. The inverter 32 is operated by a control unit 60, FIG. 3, to provide AC power at a constant volts-per-hertz ratio to the main generator portion armature windings. A system for providing excitation during starting is disclosed in co-pending application Ser. No 427,821, filed Oct. 27, 1989, now U.S. Pat. No. 4,939,441, entitled "Excitation System For A Brushless Generator Having Separate AC and DC Exciter Field Windings" and assigned to the assignee of the instant application (Sundstrand Docket No. B03271-AT1-USA), the disclosure of which is hereby incorporated by reference. Specifically, contactors 61 disconnect the rectifier 46 from the exciter field winding and connect the three-phase external AC power source 18 to a set of AC exciter field windings disposed in a stator of the generator 22. The application of AC power to the exciter AC field windings causes AC power to be produced by transformer action in the exciter armature windings which is in turn rectified and applied to the main generator field winding. Application of power to the main generator armature and field windings in turn causes rotation of the rotor 42 and common shaft 41, thus developing motive power for bringing the prime mover 12 up to self-sustaining speed.

Referring now to FIG. 3, the inverter 32 includes three inverter legs 70a, 70b and 70c which are coupled across DC rails 30a and 30b of the DC link 30. Each inverter leg 70a, 70b and 70c includes two associated switch networks 72a and 74a, 72b and 74b and 72c and 74c, respectively. The switch networks of each leg are coupled in parallel with one another across the DC rails 30a, 30b. The switch networks are formed by switches S1–S12 arranged in series-connected pairs. Thus, for example, the switch network 72a comprises power switches S1 and S2 connected in series across the rails 30a and 30b. The switches of each pair are coupled together at a switch junction 76a–76c and 78a–78c.

The switch junctions 76a–76c and 78a–78c are coupled to the autotransformer 33, and more specifically to first ends of first through sixth winding portions or primary windings 80a–80c and 82a–82c. Second ends of the winding portion 80a–80c and 82a–82c are coupled to three junctions or taps 84a–84c which are in turn coupled to seventh through ninth winding portions or secondary windings 86a–86c. As seen in FIG. 3, the winding portions 86a–86c are connected together in a wye configuration at a common tap 88 which is in turn coupled to a particular potential, such as ground potential.

The three taps 84a-84c and the common tap 88 are in turn coupled to the filter 34.

During operation in either the generating or starting modes, AC power provided via the contactors 51a-51c is rectified by the rectifier 26 comprising diodes D1-D6 connected in a bridge configuration. The resulting DC power is filtered by a capacitive filter (not shown) coupled to the DC link 30. The switches S1-S12 of the inverter 32 are operated by the control unit 60 in response to sensed parameters of the system 10 so that AC power is produced at the switch junctions 76a-76c and 78a-78c. Specifically, during operation in the generating mode, the switch networks of each inverter leg 70a-70c are operated in parallel to produce constant frequency AC power. That is, for example, the switches S1 and S3 are operated in unison as are the switches S2 and S4 of the inverter leg 70a. The switches are operated in a switching sequence which causes generation of desired three-phase AC waveforms each of which approximates a sinusoid. During operation of the switches S1-S12, each pair of windings 80a and 82a, 80b and 82b and 80c and 82c operates in a fashion similar to an interphase transformer to balance the currents flowing in the associated switch networks. Thus, for example, the currents flowing through the switches S1 and S3 are substantially balanced, as are the currents flowing through the switches S2 and S4.

The winding portions 86a-86c permit magnetizing currents to flow as well as unbalanced currents caused by load(s) coupled to the load bus 16. Also, the current flowing each of the windings 86a-86c would be split between the remaining two windings. In the preferred embodiment, the winding portions 86a-86c are sized for approximately one-third of the output power rating.

The arrangement of the autotransformer 33 permits third harmonics and multiples thereof to be eliminated. This can be accomplished using conventional transformer design techniques or by the addition of a set of three tertiary windings 100a, 100b and 100c connected in a delta configuration.

The inductance of the autotransformer 33 allows the inductance of the filter 34 to be reduced, in turn leading to a desirable reduction in the size of the latter.

It should be noted that it may prove necessary to utilize an input filter coupled to the three-phase external power source 18 to eliminate harmonics during operation in the starting mode. Also, it is necessary to use an antiparallel diode across each of the switches S1-S12, and snubber circuitry may optionally be used to dissipate switching transients.

In the preferred embodiment, the switches S1-S12 comprise insulated gate devices, such as IGBT's, MCT's or power FET's. Such switches are relatively inexpensive and are easily controlled using simple and inexpensive circuitry. If desired, additional switch networks 110a-110c having switches S13-S18 may be associated with each inverter leg 70a-70c, respectively in which case additional winding portions 112a-112c would be coupled between switch junctions 114a-114c of the switching networks 110a-110c and the appropriate taps 84a-84c, respectively. Thus, the inverter can be designed to provide increased current handling capability with only a modest increase in overall system size and weight.

I claim:

1. A power converter for converting DC power supplied on a DC rail into AC power for an AC load, comprising:

an inverter including first and second switches coupled to the DC rail;

an autotransformer including first and second winding portions having first ends coupled to the first and second switches, respectively, and second ends connected together at a common junction, the autotransformer further including a third winding portion having first and second ends coupled to the common junction and a particular DC potential, respectively;

means for operating the inverter switches to convert the DC potential on the DC rail into AC power at the common junction; and means coupled between the common junction and the AC load for supplying the AC power to the AC load.

2. The power conversion system of claim 1, wherein the switches are of the insulated-gate type.

3. The power conversion system of claim 1, wherein the switches comprise insulated gate bipolar transistors.

4. The power conversion system of claim 1, wherein the switches comprise MOS controlled thyristors.

5. The power converter of claim 1, wherein the supplying means comprises a filter coupled to the common junction and the particular potential and wherein the load is coupled to the filter.

6. The power converter of claim 1, wherein the inverter further includes third and fourth switches coupled to the DC rail, and wherein the autotransformer further includes fourth and fifth winding portions coupled to the third and fourth switches, respectively, and a sixth winding portion having one end coupled to a common junction with the fourth and fifth windings and another end coupled to the particular potential and to the second end of the third winding portion and means for operating the third and fourth switches at a particular phase relationship with respect to the operation of the first and second switches.

7. The power converter of claim 1, wherein the inverter further includes an additional switch coupled to the DC rail and wherein the autotransformer further includes a fourth winding coupled between the additional switch and the common junction and further including means for operating the additional switch in synchronism with the first and second switches.

8. A power conversion system utilizing a generator having armature windings and coupled to a prime mover wherein the power conversion system is operable in a generating mode to convert motive power developed by the prime mover into electrical power and in a starting mode to convert electrical power into motive power for starting the prime mover, comprising:

an inverter having three inverter legs, each leg comprising two switch networks connected in parallel with one another across first and second DC rails, each switch network comprising a pair of series-connected power switches coupled together at a switch junction;

an autotransformer having first through sixth winding portions each having first and second ends, the first ends of the first and second winding portions being connected to the switch junctions of said switch network in said first one of the inverter legs and the second ends of such winding portion being connected together at a first tap, the first ends of the third and fourth winding portions being connected to the switch junctions of said switch network in said second one of the inverter legs and the second ends of such winding portions being connected together at a second tap and the first ends of the fifth and sixth winding portions being connected to the switch junctions of said switch network in said third one of inverter legs and the second ends of such winding portions being connected together at a third tap, the autotransformer further including seventh, eighth and ninth winding portions having first ends coupled to the first, second and third taps, respectively, and second ends coupled together and to ground potential; and means for operating the power switches of each inverter leg to produce AC power at the first, second and third taps.

9. The power conversion system of claim 8, further including a rectifier coupled to the DC rails and means operable in the generating mode for coupling the generator to the rectifier and for coupling the first through third taps to an AC load and operable in the starting mode for coupling a source of AC power to the rectifier and for coupling the first through third taps to the generator.

10. The power conversion system of claim 8, further including a filter coupled to the first through third taps and to ground potential and which includes three phase outputs.

11. The power conversion system of claim 10, further including a rectifier coupled to the DC rails and means operable in the generating mode for coupling the generator to the rectifier and for coupling the three phase outputs of the filter to an AC load and operable in the starting mode for coupling a source of AC power to the rectifier and for coupling the three phase outputs of the filter to the generator.

* * * * *